United States Patent
Mo et al.

(10) Patent No.: US 12,499,002 B2
(45) Date of Patent: Dec. 16, 2025

(54) ANOMALY DETECTION DURING CLOUD APPLICATION INSTALLATION

(71) Applicant: INTERNATIONAL BUSINESS MACHINES CORPORATION, Armonk, NY (US)

(72) Inventors: Ying Mo, Beijing (CN); Guangya Liu, Cary, NC (US); Xiaoli Duan, Beijing (CN); Hou Fang Zhao, Beijing (CN); Yan Wei Li, Beijing (CN); Zhi Li, Beijing (CN); Yao Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 18/367,114

(22) Filed: Sep. 12, 2023

(65) Prior Publication Data
US 2025/0086043 A1    Mar. 13, 2025

(51) Int. Cl.
  *G06F 11/00* (2006.01)
  *G06F 11/07* (2006.01)
  *G06F 11/32* (2006.01)

(52) U.S. Cl.
  CPC ...... *G06F 11/0775* (2013.01); *G06F 11/0751* (2013.01); *G06F 11/0757* (2013.01); *G06F 11/076* (2013.01); *G06F 11/323* (2013.01)

(58) Field of Classification Search
  CPC ............... G06F 11/0775; G06F 11/323; G06F 11/0751; G06F 11/0757; G06F 11/076
  See application file for complete search history.

(56) References Cited

U.S. PATENT DOCUMENTS

| | | | |
|---|---|---|---|
| 7,587,299 B2 | 9/2009 | Miyasaka et al. | |
| 8,060,934 B2 | 11/2011 | Cabuk et al. | |
| 8,209,564 B2 | 6/2012 | Vidal et al. | |
| 8,996,916 B2* | 3/2015 | Huang | G06F 3/067 714/25 |
| 9,152,484 B2 | 10/2015 | Vidal et al. | |

(Continued)

FOREIGN PATENT DOCUMENTS

CN  115712443  2/2023

OTHER PUBLICATIONS

Logic Monitor, "Log Anomaly Detection", https://www.logicmonitor.com/support/log-anomaly-detection, May 11, 2023; 5 Pages.

(Continued)

*Primary Examiner* — Jonathan D Gibson
(74) *Attorney, Agent, or Firm* — Monchai Chuaychoo; Andrew D. Wright; Calderon Safran & Wright P.C.

(57) ABSTRACT

A method, system, and computer program product that are configured to: create a resource dependency graph that defines dependencies between resources created in an installation of a cloud native application, wherein the resource dependency graph includes a respective time range of each respective one of the resources; for each respective one of the resources, determine a condition of the respective one of the resources based on the respective time range of the respective one of the resources, a success condition of the respective one of the resources, and one or more failure conditions of the respective one of the resources; and create a cause analysis resource that includes the determined condition of each respective one of the resources.

19 Claims, 13 Drawing Sheets

(56) References Cited

U.S. PATENT DOCUMENTS

| | | | |
|---|---|---|---|
| 10,379,985 B1* | 8/2019 | White | G06F 11/0709 |
| 10,445,311 B1 | 10/2019 | Saurabh et al. | |
| 10,673,885 B2 | 6/2020 | Muthukrishnan et al. | |
| 11,461,721 B2 | 10/2022 | Ramakrishnaraja et al. | |
| 11,632,383 B2 | 4/2023 | Oliner et al. | |
| 2005/0278273 A1* | 12/2005 | Uthe | H04L 41/0631 |
| 2006/0101308 A1* | 5/2006 | Agarwal | G06F 11/079 |
| | | | 714/25 |
| 2008/0141240 A1 | 6/2008 | Uthe | |
| 2011/0225461 A1 | 9/2011 | Wookey | |
| 2016/0364224 A1* | 12/2016 | Tuukkanen | G06F 8/61 |
| 2017/0116059 A1* | 4/2017 | Wolf | G06F 11/0772 |
| 2017/0235558 A1* | 8/2017 | Saenz | G06F 8/61 |
| | | | 717/175 |
| 2018/0157550 A1* | 6/2018 | Ivanov | H04L 41/122 |
| 2022/0060371 A1* | 2/2022 | Paradkar | H04L 41/0677 |
| 2022/0129337 A1* | 4/2022 | Hermanns | G06N 20/00 |
| 2023/0094140 A1* | 3/2023 | Kruempelmann | G06F 11/3093 |
| | | | 709/220 |
| 2023/0185556 A1* | 6/2023 | Chen | G06F 9/3004 |
| | | | 717/174 |
| 2023/0236818 A1* | 7/2023 | Saeki | G06N 3/08 |
| | | | 717/172 |
| 2023/0281098 A1* | 9/2023 | Hesse | G06F 11/3058 |
| | | | 726/22 |

OTHER PUBLICATIONS

IBM, "What is cloud native?", https://www.ibm.com/topics/cloud-native, Aug. 12, 2023; 15 Pages.

* cited by examiner

405

```
apiVersion: installation.k8s.io/v1
kind: ResourceConditionDefinition
metadata:
  name: ibm-common-service-conditions
spec:
- kind: CommonService
  apiVersion: operator.ibm.com/v3
  conditions:
  - name: Succeeded
    type: Success
  - name: IAMInstallError
    type: Failure
    description: >
      Fails to install IAM components.
    action: >
      Please check if ibm-iam-operator is in error status or
      has error in its logs.
  - name: CommonUIInstallError
    type: Failure
    description: >
      Fails to install Common UI components.
    action: >
      Please check if ibm-commonui-operator is in error
      status or has error in its logs.
  - name: ODLMInstallError
    type: Failure
    description: >
      Fails to install Platform API components.
    action: >
      Please check if ibm-platform-api-operator is in error
      status or has error in its logs.
```

410 → (kind: CommonService ... conditions:)
415 → (Succeeded / Success)
420 → (IAMInstallError ... ODLMInstallError blocks)

FIG. 4

```
apiVersion: installation.k8s.io/v1
kind: ResourceGraph
metadata:
  name: ibm-common-services-resource-graph
spec:
 baseResource:
   name: installation
   kind: commonservice
   apiVersion: operator.ibm.com/v3
   namespaced: true
 resources:
 - name: common-web-ui-*
   kind: pod
   dependsOn:
   - name: auth-pap-*
     kind: pod
   - name: auth-idp-*
     kind: pod
   - name: auth-pdp-*
     kind: pod
 - name: auth-pap-*
   kind: pod
   dependsOn:
   - name: cs-ca-certificate-secret
     kind: secret
 - name: cs-ca-certificate-secret
   kind: secret
   dependsOn:
   - name: cert-manager-controller-*
     kind: pod
 - name: cert-manager-controller-*
   kind: pod
 - name: cs-ca-certificate-*
   kind: certificaterequest
   apiVersion: cert-manager.io/v1
   namespaced: true
   dependsOn:
   - name: cert-manager-controller-*
     kind: pod
```

$$\begin{aligned}
duration\ before\ ready = {} & \beta_0 + \beta_1 \times P1 + \beta_2 \times P2 + \beta_3 \times P3 + \beta_4 \times P4 + \beta_5 \times P5 + \beta_6 \times P6 + \\
& \sum_{k=1}^{nodeNum} (\beta_7[k] \times P7 + \beta_8[k] \times P8 + \beta_9[k] \times P9 + \beta_{10}[k] \times P10 + \beta_{11}[k] \times P11 + \beta_{12}[k] \times P12) + \varepsilon
\end{aligned}$$

ANOMALY DETECTION DURING CLOUD APPLICATION INSTALLATION

BACKGROUND

Aspects of the present invention relate generally to cloud computing and, more particularly, to detecting anomalies during cloud application installation.

Cloud computing infrastructures are becoming increasingly popular due to their increased scalability, agility, and elasticity as well as ability to quickly provision on-demand to meet increased customer requirements. Many cloud computing infrastructures provide services via containerized workloads. A cloud native application consists of discrete, reusable components known as microservices that are designed to integrate into any cloud environment.

SUMMARY

In a first aspect of the invention, there is a computer-implemented method including: creating, by a processor set, a resource dependency graph that defines dependencies between resources created in an installation of a cloud native application, wherein the resource dependency graph includes a respective time range of each respective one of the resources; for each respective one of the resources, determining, by the processor set, a condition of the respective one of the resources based on the respective time range of the respective one of the resources, a success condition of the respective one of the resources, and one or more failure conditions of the respective one of the resources; and creating, by the processor set, a cause analysis resource that includes the determined condition of each respective one of the resources.

In another aspect of the invention, there is a computer program product including one or more computer readable storage media having program instructions collectively stored on the one or more computer readable storage media. The program instructions are executable to: create a resource dependency graph that defines dependencies between resources created in an installation of a cloud native application, wherein the resource dependency graph includes a respective time range of each respective one of the resources; for each respective one of the resources, determine a condition of the respective one of the resources based on the respective time range of the respective one of the resources, a success condition of the respective one of the resources, and one or more failure conditions of the respective one of the resources; and create a cause analysis resource that includes the determined condition of each respective one of the resources.

In another aspect of the invention, there is a system including a processor set, one or more computer readable storage media, and program instructions collectively stored on the one or more computer readable storage media. The program instructions are executable to: create a resource dependency graph that defines dependencies between resources created in an installation of a cloud native application, wherein the resource dependency graph includes a respective time range of each respective one of the resources; for each respective one of the resources, determine a condition of the respective one of the resources based on the respective time range of the respective one of the resources, a success condition of the respective one of the resources, and one or more failure conditions of the respective one of the resources; and create a cause analysis resource that includes the determined condition of each respective one of the resources.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 4 shows an exemplary resource condition definition for a custom resource in accordance with aspects of the present invention.

FIG. 5 shows an exemplary resource dependency graph in accordance with aspects of the present invention.

FIG. 8 shows an exemplary linear regression model for determining values of the ranges and in accordance with aspects of the present invention.

DETAILED DESCRIPTION

Figure 1:
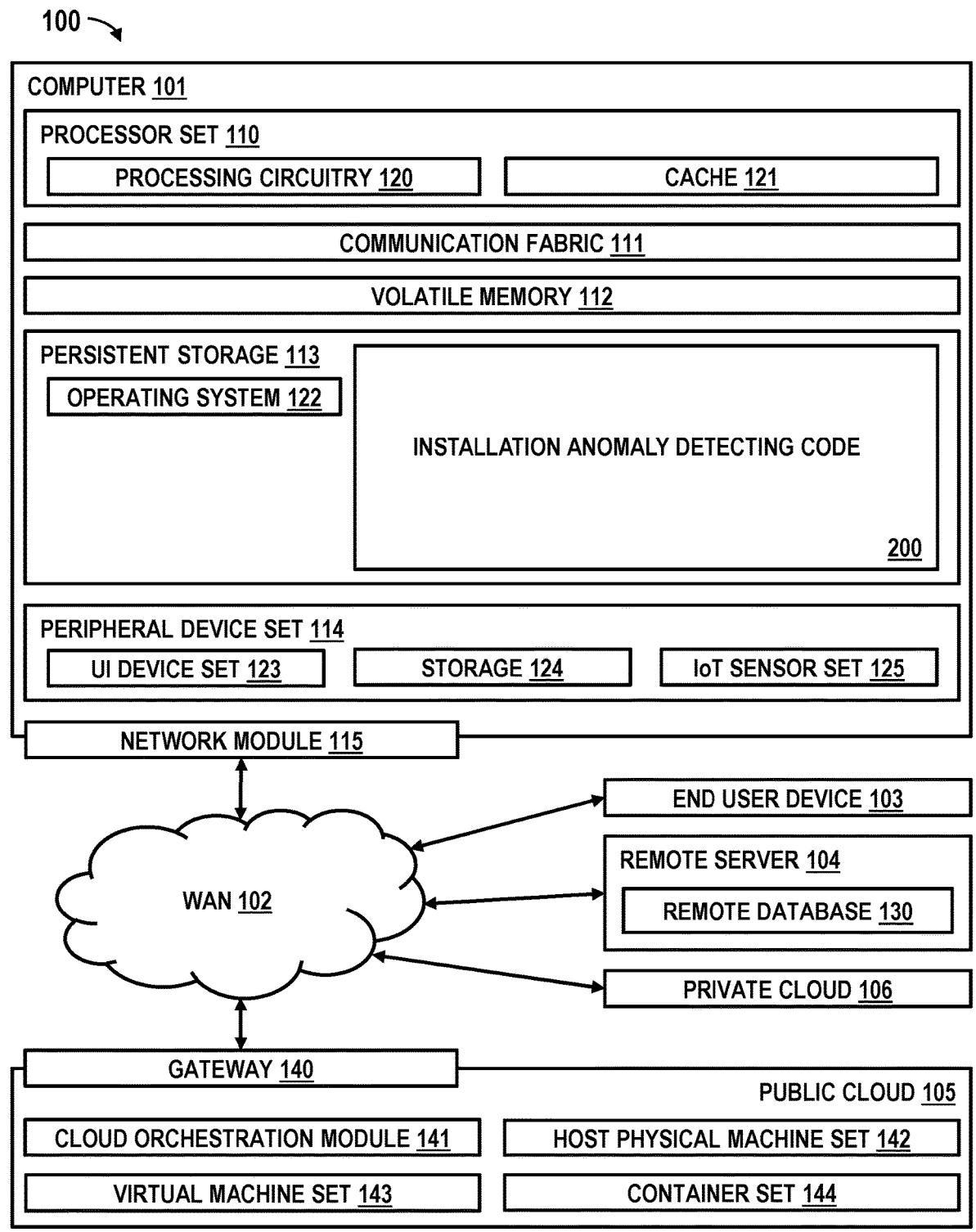
FIG. 1 depicts a computing environment according to an embodiment of the present invention.

Aspects of the present invention relate generally to cloud computing and, more particularly, to detecting anomalies during cloud application installation. Implementations of the invention monitor successful installation of cloud native applications and collect information for cause analysis of an installation failure. Implementations detect anomalies during application installation and report installation failure as early as possible when an anomaly is detected. Implementations provide cause analysis details including suggestions and evidence to assist troubleshooting the installation failure.

Installing a cloud native application typically involves a long wait time for the installation to complete. It is common for the installation to fail early in the process and for the user to not become aware of the failure until they have waited the full wait time or longer. An end user who has limited knowledge of the application being installed may not be aware that a failure has occurred in the installation. The user may also be faced with false alarms that do not amount to failure. For example, a pod failure by itself does not necessarily mean that the installation has failed, since a pod failure because of a missing secret may recover itself at a later time during the installation. Conversely, all pods running does not necessarily mean that there is no problem with the installation. There can be errors in the logs of a running pod that break the system, for example when one pod has failed to run due to a missing secret, but the user does not know which pod should have created the secret and why it did not create the secret. In a complex application, there may be too many pods for a user to analyze which pod has an error in its logs, or there may be too many pods in error status making it difficult to determine which failure is the root of another failure.

An installation failure typically does not involve a single intermediate failure but rather is the result of multiple intermediate failures, some of which are caused by others. Once an installation failure is detected, after a long wait time, a user performing the installation may manually determine the root cause of the installation failure by identifying an intermediate failure and its cause, which leads to another intermediate failure and its cause, and so on until the root cause is identified. For example, a user installing an application may detect an installation failure due to some pods failing to start. The user may manually investigate the installation failure by navigating through a resource chain via annotations, labels, and metadata, by analyzing different snapshots between good and bad environments, and by analyzing common patterns in pod logs. In this example, the user may first determine that some pods crash or keep creating and some pods are pending on 'init'. Based on this intermediate failure, the user may determine that the pods logs show a missing secret. In response, the user may determine which resource should have created the secret that is missing. The user may use the identity of this resource to identify errors in cert-manager pod logs. The user may analyze the errors in the cert-manager pod logs to determine that duplicate cert requests were made. The user may then determine which resources created the duplicate cert requests. The user may then delete the duplicate cert requests, resulting in the issue being resolved. In this example, the user analyzes multiple intermediate issues to determine that the root cause was the duplicate cert requests. This is problematic because (i) the user needlessly waits the full installation time before being able to detect that an installation failure has occurred and (ii) the user expends time and energy manually tracking down the root cause of the installation failure through multiple intermediate failures.

Implementations of the invention address these problems by providing a method, system, and computer program product that are configured to: create a resource dependency graph that defines dependencies between resources created in an installation of a cloud native application, wherein the resource dependency graph includes a respective time range of each respective one of the resources; for each respective one of the resources, determine a condition of the respective one of the resources based on the respective time range of the respective one of the resources, a success condition of the respective one of the resources, and one or more failure conditions of the respective one of the resources; and create a cause analysis resource that includes the determined condition of each respective one of the resources. Implementations use a timeline (e.g., time range) as a factor when detecting an installation anomaly and for avoiding false alarms. Implementations detect an anomaly against a resource based on a data structure referred to as a resource condition definition, which comprises a knowledge base built from one or more of predefined knowledge, user input, and artificial intelligence technology such as log anomaly detecting. Implementations provide better interpretability for cause analysis of an installation anomaly by navigating through a resource dependency graph which is generated from successful installations with all the successful factors encoded. Implementations use a combination of the resource dependency graph and the resource condition definition to verify the installation success of a cloud native application. Use of timelines as described herein provides for earlier identification of anomalies during the installation of a cloud native application, which decreases the wait time of the user performing (or monitoring) the installation. Use of a resource dependency graph as described herein provides improved interpretability for the user analyzing the installation failure, which advantageously reduces the amount of effort required in determining the root cause of the installation failure. In this manner, implementations of the invention provide an improvement in the technology of cloud computing generally and in the task of cloud native application installation specifically.

In accordance with aspects of the invention, a method, system, and computer program product are configured to: create a resource dependency graph that defines dependencies between resources created in an installation of a cloud native application, wherein the resource dependency graph includes a respective time range of each respective one of the resources; for each respective one of the resources, determine a condition of the respective one of the resources based on the respective time range of the respective one of the resources, a success condition of the respective one of the resources, and one or more failure conditions of the respective one of the resources; and create a cause analysis resource that includes the determined condition of each respective one of the resources. Creating and using a resource dependency graph advantageously provides better interpretability. Using a time range (also called a timeline herein) advantageously reduces false alarms.

In embodiments, the determined condition of each respective one of the resources comprises one of success, failure, and pending. In this manner, a user can determine the condition of each resource when troubleshooting an anomaly during installation, which increases efficiency of the troubleshooting.

In embodiments, the success condition of the respective one of the resources and the one or more failure conditions of the respective one of the resources are defined in a resource condition definition of the respective one of the resources. Using a resource condition definition for each resource provides the benefit of a knowledge base that includes known successes and failures of a resource which aids in troubleshooting an anomaly during installation.

In embodiments, the one or more failure conditions comprise at least one selected from a group consisting of: failure conditions with clear cause; failure conditions without clear cause; and errors in workload logs with clear cause. In this manner, implementations advantageously account for different types of failure conditions that might occur, which aids in troubleshooting an anomaly during installation.

In embodiments, the respective time range of a respective one of the resources comprises: a first time range that defines when the respective one of the resources is expected to be created relative to a base resource; and a second time range that defines when the respective one of the resources is expected to be ready after it has been created. Using different time ranges provides more interpretability and further reduces false alarms.

In embodiments, the method, system, and computer program product are further configured to determine a minimum and maximum for the first time range and a minimum and maximum for the second time range using models, which may be trained using data of historic installations of the cloud native application. In this manner, implementations of the invention advantageously determine realistic time frames for these aspects of the installation of each resource.

In embodiments, the method, system, and computer program product are further configured to create a visualization using the cause analysis resource, wherein the visualization includes: the resources arranged in a diagram that shows the dependencies between the resources; and the determined condition for each of the resources. This provides improved interpretability for a user who is troubleshooting an anomaly during installation.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as installation anomaly detecting code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
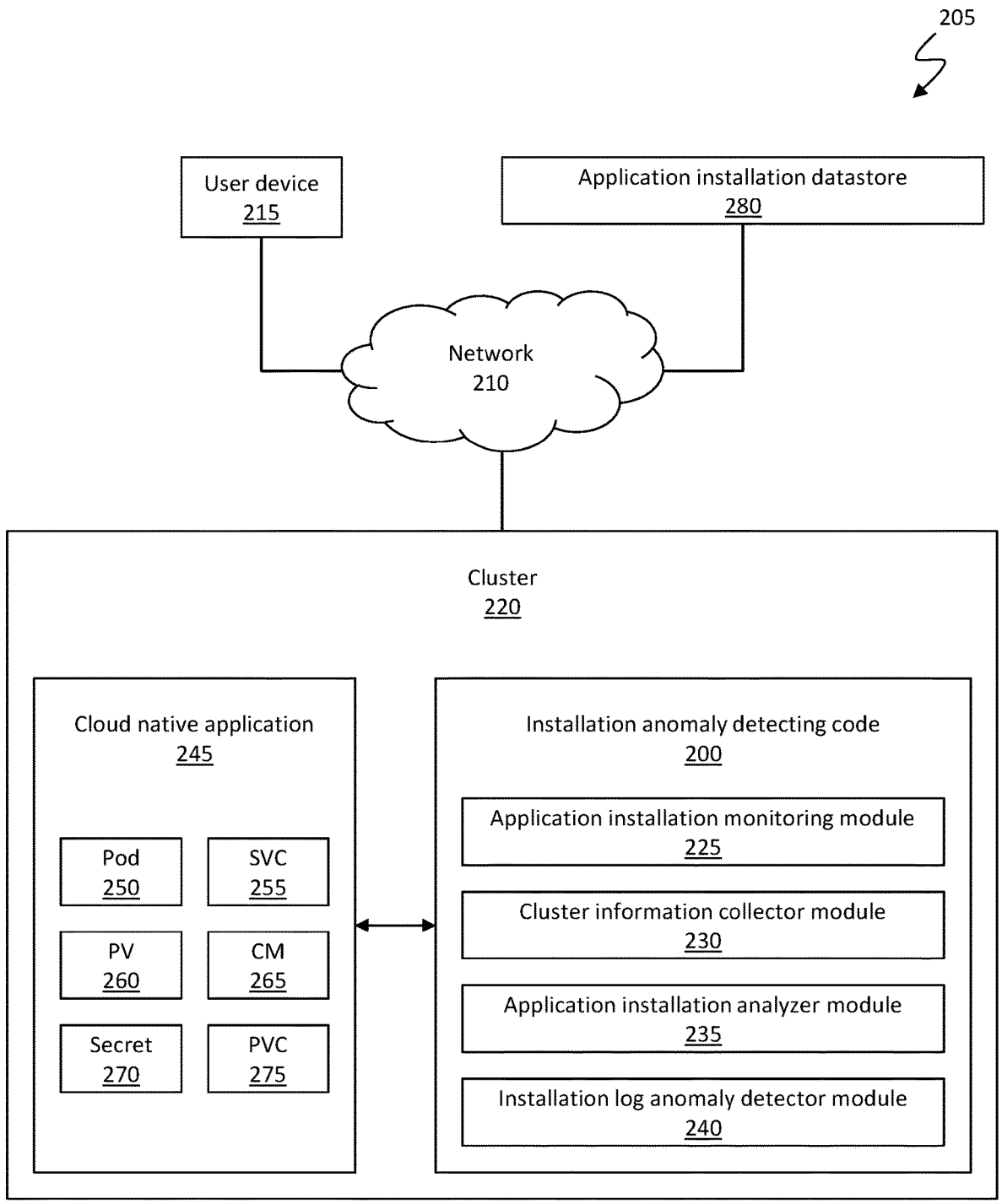
FIG. 2 shows a block diagram of an exemplary environment in accordance with aspects of the present invention.

FIG. 2 shows a block diagram of an exemplary environment 205 in accordance with aspects of the invention. In embodiments, the environment includes a network 210 that provides communication between a user device 215 and a cluster 220. The network 210 may comprise the WAN of FIG. 1 and the user device 215 may comprise one or more instances of the EUD 103 of FIG. 1.

In embodiments, the cluster 220 comprises a computing cluster including nodes that run containerized applications that provide online services to end user devices. In a particular example, the cluster 220 is a Kubernetes cluster. Each node in the cluster 220 may comprise a computing device that hosts one or more pods. As is understood in the art, pods contain one or more containers, such as Docker containers. The pods run on the nodes and represent a single instance of a running process in the cluster 220. Kubernetes is an open-source container orchestration system for automating software deployment, scaling, and management. Aspects of the present disclosure are described using Kubernetes as an example; however, embodiments of the invention are not limited to use with Kubernetes. Instead, embodiments may be used with any suitable container orchestration system.

In embodiments, the cluster 220 comprises the installation anomaly detecting code of block 200. In embodiments, the installation anomaly detecting code comprises application installation monitoring module 225, cluster information collector module 230, application installation analyzer module 235, and installation log anomaly detector module 240, each of which may comprise modules of the code. Such modules may include routines, programs, objects, components, logic, data structures, and so on that perform particular tasks or implement particular data types that the installation anomaly detecting code of block 200 uses to carry out the functions and/or methodologies of embodiments of the invention as described herein. These modules of the installation anomaly detecting code of block 200 are executable by the processing circuitry 120 of FIG. 1 to perform the inventive methods as described herein. The installation anomaly detecting code may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In an exemplary implementation, the installation anomaly detecting code of block 200 is comprised in an operator. Operators are extensions to the Kubernetes API (application programming interface) that use custom resources to manage Kubernetes applications and their components. Operators automate software configuration and maintenance activities that are typically performed by human operators. Operators extend the Kubernetes control plane with specialized functionality to manage a workload on behalf of a Kubernetes administrator.

In accordance with aspects of the invention, the installation anomaly detecting code of block 200 monitors the installation of a cloud native application 245 in the cluster 220. The cloud native application 245 may include multiple resources including one or more of: one or more pods 250; one or more services (SVC) 255; one or more persistent volumes (PV) 260; one or more 'configmap' (CM) 265; one or more secrets 270; and one or more persistent volume claim (PVC) 275. In accordance with aspects of the invention, the user device 215 requests installation of the cloud native application 245. In one exemplary implementation, the installation anomaly detecting code of block 200 automatically monitors the installation of the cloud native application 245 based on the user device 215 requesting the installation. In another exemplary implementation, the installation anomaly detecting code of block 200 monitors the installation of the cloud native application 245 in response to receiving a separate request from the user device 215 to detect installation anomalies.

In accordance with aspects of the invention, the application installation monitoring module 225 monitors installation of the cloud native application 245 and generates a resource dependency graph and timestamps for each of these resources involved in the installation. In embodiments, the application installation monitoring module 225 stores data associated with these tasks in an application installation datastore 280, which may comprise one or more instances of persistent storage 113, storage 124, and remote database 130 of FIG. 1.

In accordance with aspects of the invention, the cluster information collector module 230 collects system information, resource capacity, and actual usage on each node to help predict the range of the created time and duration before ready for each resource. In embodiments, the cluster information collector module 230 stores data associated with these tasks in the application installation datastore 280.

In accordance with aspects of the invention, the application installation analyzer module 235 performs installation anomaly detecting and provides cause analysis based on data collected by other modules and stored in the application installation datastore 280. In accordance with aspects of the invention, the installation log anomaly detector module 240 generates log error patterns by tracking workload log streams. Installation data collecting may be performed before product release to build the initial model, or after release, which data is collected in customer environment if permitted. In this manner, implementations improve the installation timeline prediction accuracy.

In accordance with aspects of the invention, the application installation monitoring module 225 obtains a respective resource condition definition for each respective resource included in the cloud native application 245 being installed. In embodiments, a resource condition definition contains data that defines certain aspects of a resource including but not limited to: resource name; resource kind; success conditions for this resource; failure conditions with clear cause for this resource; failure conditions without clear cause for this resource; and errors in workload logs with clear cause for this resource. In embodiments, each resource condition definition can be for a pre-configured resource or for a custom resource. The resource condition definitions may be stored in the application installation datastore 280 and may be obtained by the application installation monitoring module 225 during installation of the cloud native application 245 based on determining which resources are included in the cloud native application 245.

Figure 3:
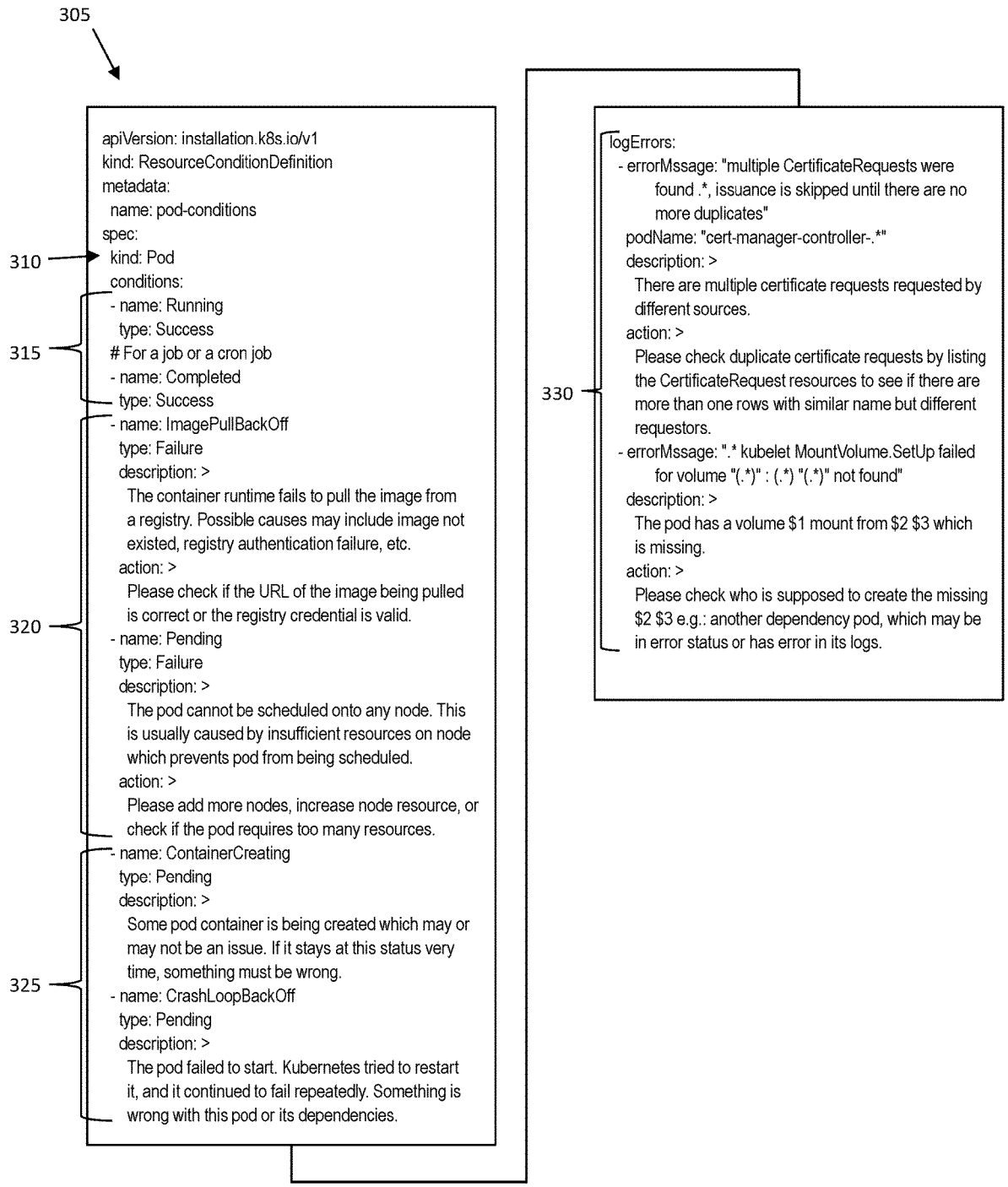
FIG. 3 shows an exemplary resource condition definition for a pre-configured resource in accordance with aspects of the present invention.

FIG. 3 shows an exemplary resource condition definition 305 for a pre-configured resource in accordance with aspects of the present invention. The resource condition definition 305 includes data defining a resource kind 310 (also referred to as type), success conditions 315 for this resource; failure conditions with clear cause 320 for this resource; failure conditions without clear cause 325 for this resource; and errors in workload logs with clear cause 330 for this resource. In embodiments, the resource condition definition 305 comprises a configuration file such as a YAML (Yet Another Markup Language) file, for example.

In embodiments, the success and failure conditions 315, 320, and 325 in the resource condition definition 305 are based on success and failure conditions observed for this type of resource during previous (e.g., historic) installations of the cloud native application 245 and/or other applications. For example, these conditions may be based on common patterns seen in the container orchestration system when installing applications that include these resources.

In embodiments, the errors in workload logs with clear cause 330 in the resource condition definition 305 are based on log error patterns detected by a log anomaly detection (LAD) algorithm for this type of resource during previous installations of the cloud native application 245. In embodiments, anomalies in error logs are treated as changes that fall outside of the common patterns identified in the previous success installations for a particular application. Applying an LAD algorithm to cloud native application installation builds more log error patterns to enrich the resource condition definitions. Applying an LAD algorithm to cloud native application installation also obtains results that are more reliable than those in other areas because application installation use cases usually generate a more stable log stream than other use cases. In embodiments, the system uses an LAD algorithm to analyze and learn the structure of incoming logs and build a library of profiles for each record. In embodiments, a record only relates to one profile, and a profile can relate to more than one record. In embodiments, new incoming logs are matched against the learned profiles to determine if they have seen before or are new patterns. In embodiments, the new anomalies are added as new log error patterns to the errors in workload logs with clear cause 330 of the resource condition definition 305.

FIG. 4 shows an exemplary resource condition definition 405 for a custom resource in accordance with aspects of the present invention. The resource condition definition 405 includes data defining a resource kind 410 (also referred to as type), success conditions 415 for this resource, and failure conditions 420 for this resource. In embodiments, the resource condition definition 405 comprises a configuration file such as a YAML file, for example. In embodiments, the success and failure conditions 415 and 420 in the resource condition definition 405 are based on user input. As opposed to a pre-configured resource that is used by many different applications, a custom resource is a resource that is created manually and is specific to a particular application. As a result, in embodiments, the resource condition definition 405 for a custom resource is manually created with success and failure conditions 415 and 420 that are defined by user input.

FIG. 5 shows an exemplary resource dependency graph 505 in accordance with aspects of the present invention. In embodiments, the resource dependency graph 505 is generated by the application installation monitoring module 225 and is used to record all resources and their dependencies that are generated during (e.g., as part of) the installation of the cloud native application 245. The resource dependency graph 505 can be used to assist the troubleshooting of installation failure, e.g., to identify which resource causes the failure by navigating through the dependency chain. In embodiments, the resource dependency graph 505 contains data that defines dependencies between ones of the resources that are generated during the installation of the cloud native application 245. In embodiments, the resource dependency graph 505 comprises a configuration file such as a YAML file, for example.

Figure 6:
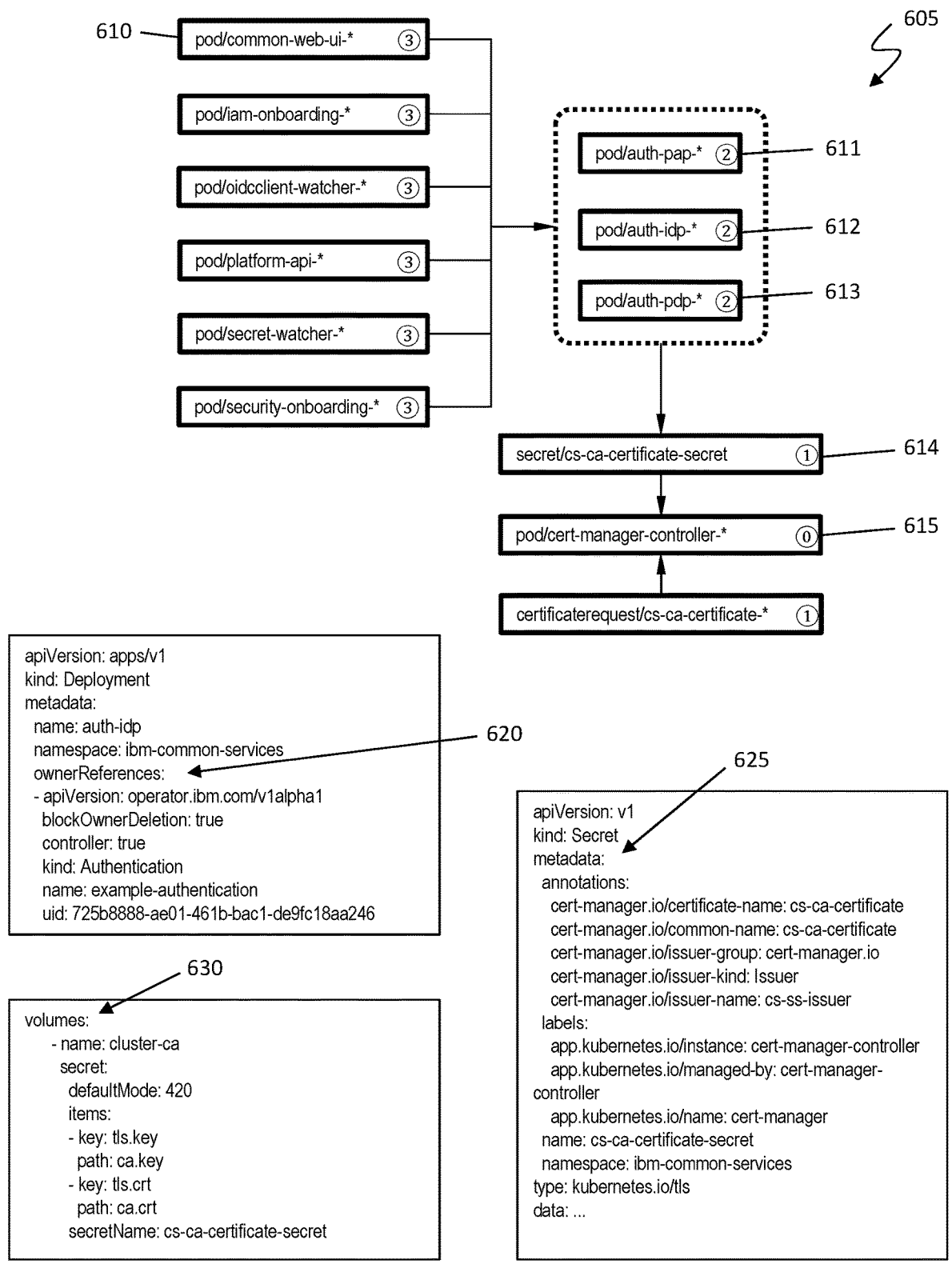
FIG. 6 shows a diagram that visually depicts the dependencies defined in a resource dependency graph in accordance with aspects of the present invention.

FIG. 6 shows a diagram 605 that visually depicts the dependencies defined in the resource dependency graph 505 of FIG. 5 in accordance with aspects of the present invention. In the diagram 605, the circled numbers 0, 1, 2, 3 represent the sequence of the dependency of one resource relative to another. For example, as shown in the diagram 605, pod 610 named "common-web-ui" depends on three authorization pods 611, 612, and 613, which each depend on a certificate secret 614, which depends on a certificate manager controller 615. In embodiments, the application installation monitoring module 225 generates the resource dependency graph 505 by reading annotations, labels, and other metadata for the resources generated by the installation of the cloud native application 245. For example, the dependency data can be generated using one more of several sources after application installation completes successfully including: owner references annotation 620; other annotations, labels, and metadata 625; volume mounts 630; and known patterns in workload logs. The generated result can be reviewed, and enhanced by a user, e.g., by adding implicit dependencies that are missing in the result.

Figure 7:
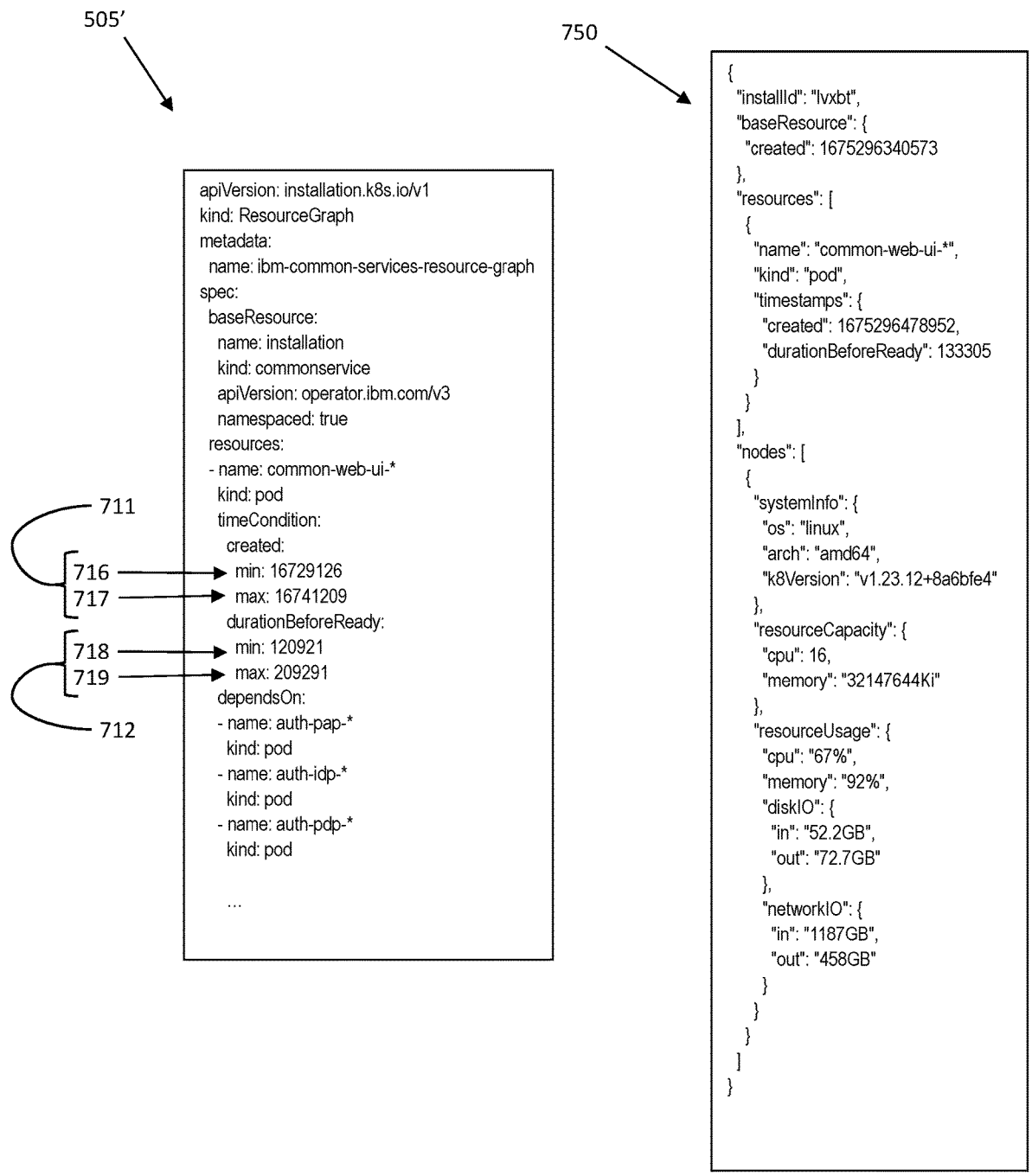
FIG. 7 shows an exemplary updated resource dependency graph in accordance with aspects of the present invention.

FIG. 7 shows an exemplary updated resource dependency graph 505' in accordance with aspects of the present invention. In embodiments, the updated resource dependency graph 505' comprises the resource dependency graph 505 of FIG. 5 with added data that defines a respective first time range 711 and a respective second time range 712 for each respective resource in the resource dependency graph 505.

In embodiments, the first time range 711 of a resource comprises a creation time for that resource including a creation time minimum 716 and a creation time maximum 717 each measured relative to a base resource. In the example shown in FIG. 7, the resource is a pod named "common-web-ui" and the base resource is a custom resource named "installation". In this example, the creation time minimum 716 and a creation time maximum 717 define a range of time within which the system expects the pod named "common-web-ui" to be created relative to the creation of the base resource "installation". The first time range is defined in terms of units of time relative to the creation of the base resource. In this example, the creation time minimum 716 is 16729126 micro-seconds and the creation time maximum 717 is 16741209 micro-seconds. In embodiments, the base resource is the first resource created with the cloud native application 245.

In embodiments, the second time range 712 of a resource comprises a duration before ready time for that resource including a duration before ready minimum 718 and a duration before ready maximum 719 each measured relative to when this resource was created. In the example shown in FIG. 7, the resource is the pod named "common-web-ui", the duration before ready minimum 718 is 120921 micro-seconds, and the duration before ready maximum 719 is 209291 micro-seconds.

In accordance with aspects of the invention, the first time range 711 defines a time that a resource is expected to be created relative to the base resource and the second time range 712 defines a time that the resource is expected to be ready after it has been created. In embodiments, the application installation monitoring module 225 generates a respective first time range 711 and a respective second time range 712 for each respective resource in the resource dependency graph 505 based on the resource dependency graph 505 and previous installation data 750. For each installation, both the time that a resource is created and the duration before this resource is ready are predicted. When deploying the same application in different environments, the values of the first time and the second time range can be various and determined by factors including one or more of: number of nodes; operating system for each node; system architecture for each node; container management system version for each node; CPU (central processing unit) capacity for each node; memory capacity for each node; CPU usage for each node; memory usage for each node; disk IO (input/out) in for each node; disk IO out for each node; network IO in for each node; and network IO out for each node. In embodiments, these factors are treated as independent variables and the values of the time ranges are treated as dependent variables. Examples of values of these variables are shown in the exemplary previous installation data 750.

FIG. 8 shows an exemplary linear regression model 805 for determining values of the ranges 711 and 712 in accordance with aspects of the present invention. The model 805 shown in FIG. 8 is for a specific example of determining a value of duration before ready, which is the dependent variable that represents the time it takes for the resource to become ready. Different instances of the model 805 may be created and then used to determine the values of creation time minimum 716, creation time maximum 717, duration before ready minimum 718, and duration before ready maximum 719 as shown in updated resource dependency graph 505' of FIG. 7.

In the model 805, $\beta_0$ is the intercept which represents the expected value of duration before ready when all independent variables are equal to zero. The symbols $\beta_1$ through $\beta_6$ and $\beta_7[k]$ through $\beta_{12}[k]$ are the regression coefficients that represent an expected change in duration before ready associated with a one-unit increase in each independent variable, holding other independent variables constant. The summation portion of the model (i.e., $\Sigma(\beta_7[k] \ldots)$) indicates the polynomial variables of various resource usage situations on each node added through loops. The symbol $\varepsilon$ represents the error term that captures the variability of duration before ready that is not explained by the independent variables. The variables P1 through P12 represent values of the independent variables mentioned above. In one example these variables include: P1 (e.g., nodeNum) representing a value of number of nodes; P2 (e.g., sysInfo.os) representing a value of operating system; P3 (e.g., sysInfo.arch) representing a value of system architecture; P4 (e.g., sysInfo.k8Version) representing a value of container management system version; P5 (e.g., resCapacity.cpu) representing a value of CPU (central processing unit) capacity; P6 (e.g., resCapacity.memory) representing a value of memory capacity; P7 (e.g., resUsage.cpu) representing a value of CPU usage; P8 (e.g., resUsage.memory) representing a value of memory usage; P9 (e.g., resUsage.diskIO.in) representing a value of disk IO (input/out) in; P10 (e.g., resUsage.diskIO.out) representing a value of disk IO out; P11 (e.g., resUsage.networkIO.in) representing a value of network IO in; and P12 (e.g., resUsage.networkIO.out) representing a value of network IO out.

In embodiments, in a training phase the application installation monitoring module 225 determines values of the coefficients $\beta_1$ through $\beta_6$ and $\beta_7[k]$ through $\beta_{12}[k]$ by solving the model 805 using multiple instances of historic data that each include historic values of duration before ready and P1 through P12. Examples of values of the variables P1 through P12 for a single historic installation, as well as an observed created time and an observed duration before ready time for this historic installation, are shown in the exemplary previous installation data 750 of FIG. 7. Multiple different instances of previous installation data may be used to solve the model 805 to determine the values of the coefficients $\beta_1$ through $\beta_6$ and $\beta_7[k]$ through $\beta_{12}[k]$. After determining the values of the coefficients $\beta_1$ through $\beta_6$ and $\beta_7[k]$ through $\beta_{12}[k]$, in a use phase the application installation monitoring module 225 uses current values of P1 through P12 with the model 805 to predict a current value of duration before ready. In embodiments, during the training phase, the cluster information collector module 230 obtains the historic data including historic values of duration before ready and P1 through P12. In embodiments, during the use phase, the cluster information collector module 230 obtains the current values of P1 through P12. In embodiments, a respective model including a respective set of coefficients $\beta_1$ through $\beta_6$ and $\beta_7[k]$ through $\beta_{12}[k]$ is determined for each of creation time minimum 716, creation time maximum 717, duration before ready minimum 718, and duration before ready maximum 719. In one example, to estimate the values of the $\beta$ coefficients, the system uses an OLS (Ordinary Least Squares) method. In one example, the system uses a multiple linear regression function provided by a programming language or statistical software package.

In embodiments, P1 (e.g., nodeNum) is a numerical variable and is measured in a unit such as number of nodes. P1 may have a very large range of values, whereas the other variables P2 through P12 may have much smaller ranges. In this case, the system standardizes P1 by subtracting the mean and dividing by the standard deviation so that it has a mean of 0 and a standard deviation of 1. The result may be termed nodeNum$_s$ as the new independent variable given by the following expression:

$$\text{nodeNum}_s = (\text{nodeNum} - \text{mean}(\text{nodeNum}))/\text{sd}(\text{nodeNum}) \quad (1)$$

In embodiment, P2 (e.g., sysInfo.os), P3 (e.g., sysInfo.arch), and P4 (e.g., sysInfo.k8Version) are categorical variables that are suboptimal for using in a regression model directly because they are not necessarily numeric values. In embodiments, the system converts these into binary variables using one-hot encoding. Taking P2 (sysInfo.os) as example, this may have three possible values: Windows, Linux, AIX. With one-hot encoding solution, the system create three binary variables: isWindows, isLinux and isAIX. In this example, for each host, exactly one of these variables would be set to 1 and the other two would be set to 0. In this manner, P2 may be converted to a numerical value that is well suited for the linear regression model. Similar conversions may be used for P3 and P4.

Figure 9:
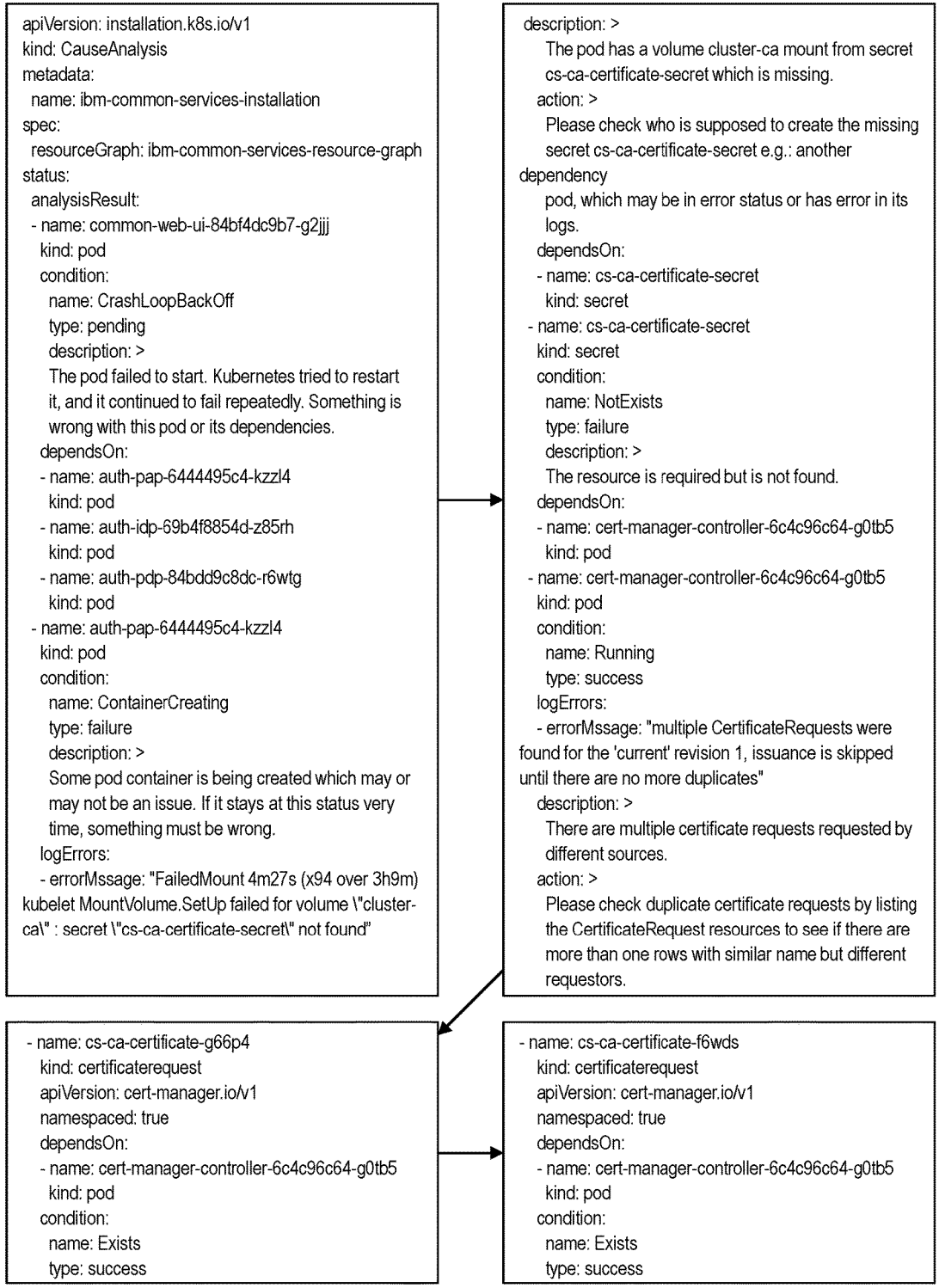
FIG. 9 shows an exemplary cause analysis resource in accordance with aspects of the present invention.

FIG. 9 shows an exemplary cause analysis resource 905 in accordance with aspects of the present invention. During the installation of the cloud native application 245, the application installation analyzer module 235 loops through all the resources included in the updated resource dependency graph 505' and determines a respective condition for each respective resource included in the updated resource dependency graph 505'. In embodiments, the condition is one of: pending; success; and failure. In embodiments, the application installation analyzer module 235 creates the cause analysis resource 905 for the installation to include the determined condition of each resource included in the installation. In embodiments, during the installation, the application installation analyzer module 235 repeatedly loops through all the resources in the updated resource dependency graph 505' and determines the condition for each resource during that iteration. In this manner, the application installation analyzer module 235 may update the cause analysis resource 905 in real time (or near real time) based on changing conditions for the resources. In this manner, the system may use the cause analysis resource 905 to provide real time (or near real time) status updates of the installation of the cloud native application 245 to the user.

In embodiments, the application installation analyzer module 235 determines the condition for a particular resource using the first time range 711 and the second time range 712 for this resource as defined in the updated resource dependency graph 505' as well as the success and failure conditions (e.g., 315, 320, 325, and 330, or 415 and 420) defined in the resource condition definition (e.g., 305 or 405) for this particular resource. In one example, based on the success condition 315 being satisfied, the application installation analyzer module 235 deems the condition for this resource as success. In another example, based on one of the failure conditions 320, 325, 330 being satisfied, the application installation analyzer module 235 deems the condition for this resource as failure. In another example, based on the resource not being created within the first time range 711, the application installation analyzer module 235 deems the condition for this resource as failure. In another example, based on the resource being created within the first time range 711 and not being ready within the second time range 712, the application installation analyzer module 235 deems the condition for this resource as failure. In another example, based on none of the success and failure conditions being satisfied, and based on the resource not having been created and the first time range 711 not yet expiring, the application installation analyzer module 235 deems the condition for this resource as pending. In another example, based on none of the success and failure conditions being satisfied, the resource having been created within the first time range 711, the resource not yet being ready, and the second time range 712 not yet expiring, the application installation analyzer module 235 deems the condition for this resource as pending.

Figure 10:
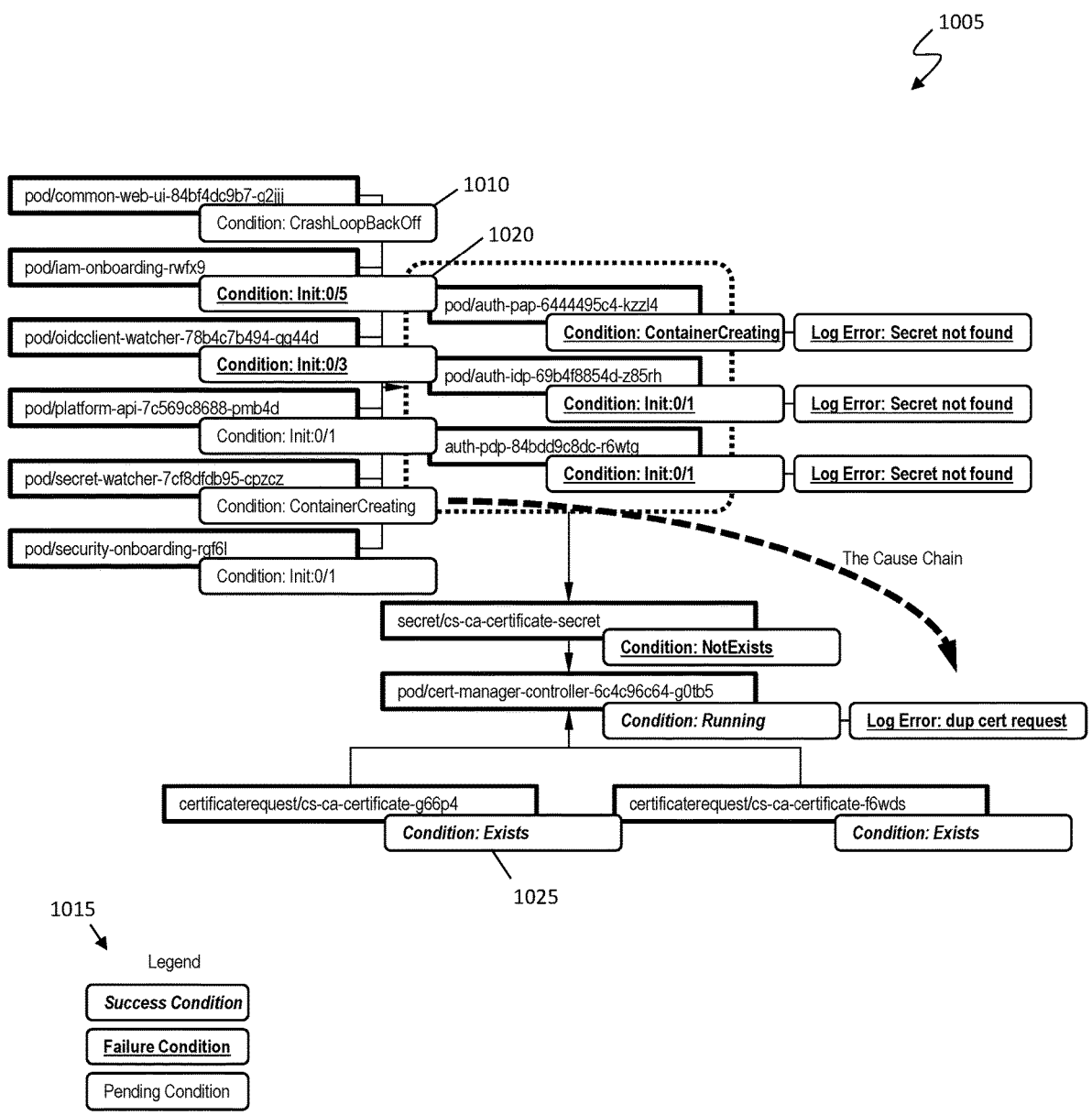
FIG. 10 shows an exemplary visualization 1005 of an installation status in accordance with aspects of the present invention.

FIG. 10 shows an exemplary visualization 1005 of an installation status in accordance with aspects of the present invention. In embodiments, the visualization 1005 includes a diagram (e.g., similar to diagram 605 of FIG. 6) that visually depicts the dependencies defined in the resource dependency graph for the installation of the cloud native application 245. In embodiments, the visualization 1005 also includes a condition indicator for each resource included in the diagram. In embodiments, the condition of a resource shown in the condition indicator associated with that resource is obtained from the cause analysis resource 905 of FIG. 9. In embodiments, the visualization 1005 is presented to the user via a user interface (UI) via the user device 215 of FIG. 2. In this manner, the user may be provided with a real time (or near real time) status update of the installation of the cloud native application 245 including a determined condition (e.g., success, failure, or pending) for each resource created in the installation.

In one example shown in FIG. 10, the resource "pod/common-web-ui-84bf4dc9b7-g2jjj" in the visualization 1005 has a condition indicator 1010 that indicates a condition of "CrashLoopBackOff" which corresponds to a condition of pending according to the legend 1015. In another example, the resource "pod/iam-onboarding-rwfx9" in the visualization 1005 has a condition indicator 1020 that indicates a condition of "Init:0/5" which corresponds to a condition of failure according to the legend 1015. In another example, the resource "certificaterequest/cs-ca-certificate-g66p4" in the visualization 1005 has a condition indicator 1025 that indicates a condition of "Exists" which corresponds to a condition of success according to the legend 1015.

In embodiments, when an installation failure happens, the application installation analyzer module 235 loops through all involved resources via the resource dependency graph and attaches failure condition and log errors to the failure resources based on resource condition definition to show the cause chain. In embodiments, the cause analysis resource 905 and the corresponding visualization 1005 can be updated at runtime dynamically during the time when resource failures are being resolved.

Figure 11:
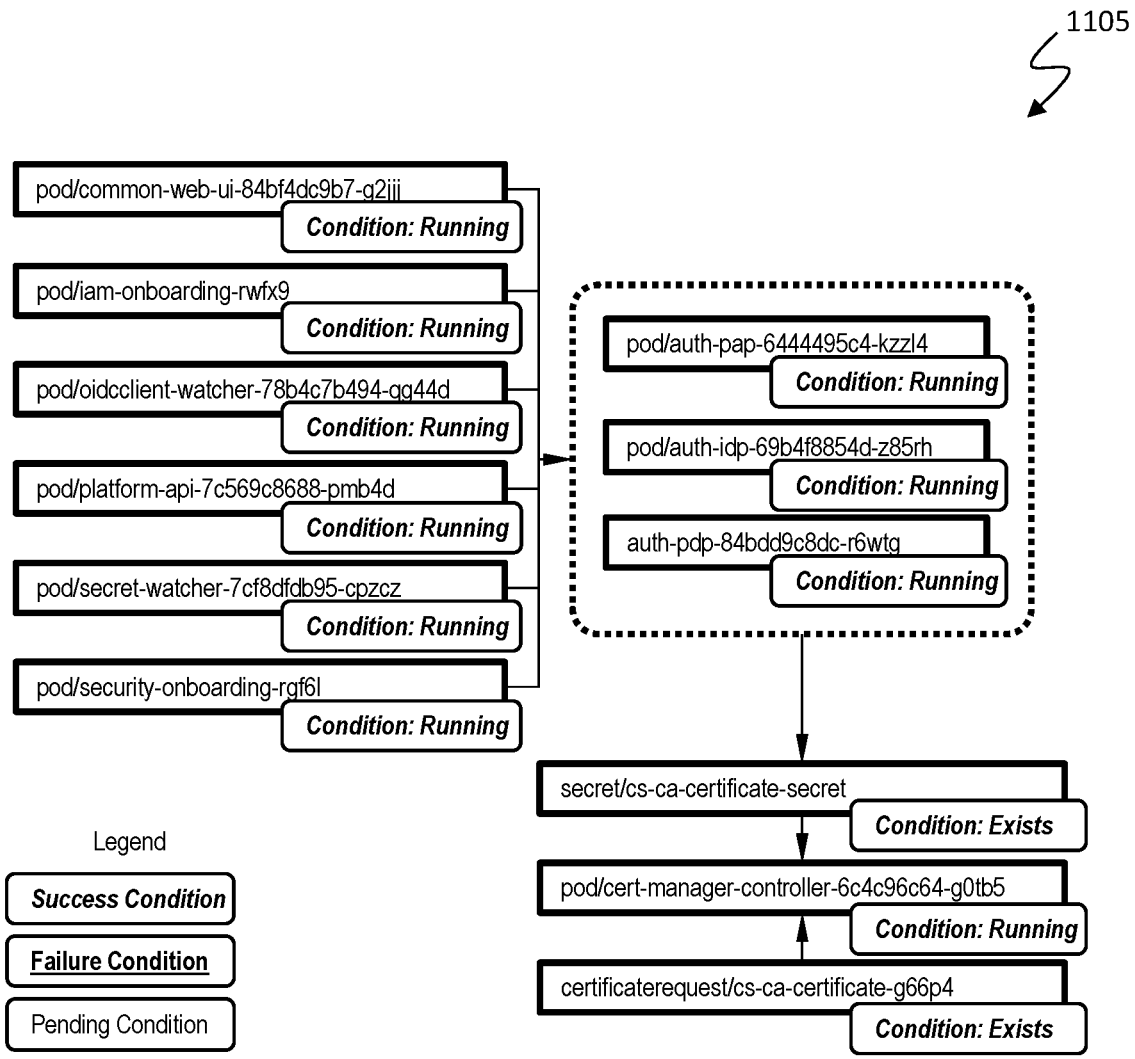
FIG. 11 shows another exemplary visualization 1105 of an installation status in accordance with aspects of the present invention.

FIG. 11 shows another exemplary visualization 1105 of an installation status in accordance with aspects of the present invention. In embodiments, the visualization 1105 includes a diagram (e.g., similar to diagram 605 of FIG. 6) that visually depicts the dependencies defined in the resource dependency graph for the installation of the cloud native application 245. In embodiments, the visualization 1105 also includes a condition indicator for each resource included in the diagram. As described above, the condition of a resource shown in the condition indicator associated with that resource is obtained from the cause analysis resource 905 of FIG. 9. In embodiments, the visualization 1105 is presented to the user via a user interface (UI) via the user device 215 of FIG. 2. In the example shown in FIG. 11, all the resources are shown with a condition of success. The visualization 1105 represents a usage scenario in which a post-installation step is applied for an application installation to check if the installation is successful by going through the resource graph to check if: no resource is missing; and all resources success conditions are met.

Figure 12:
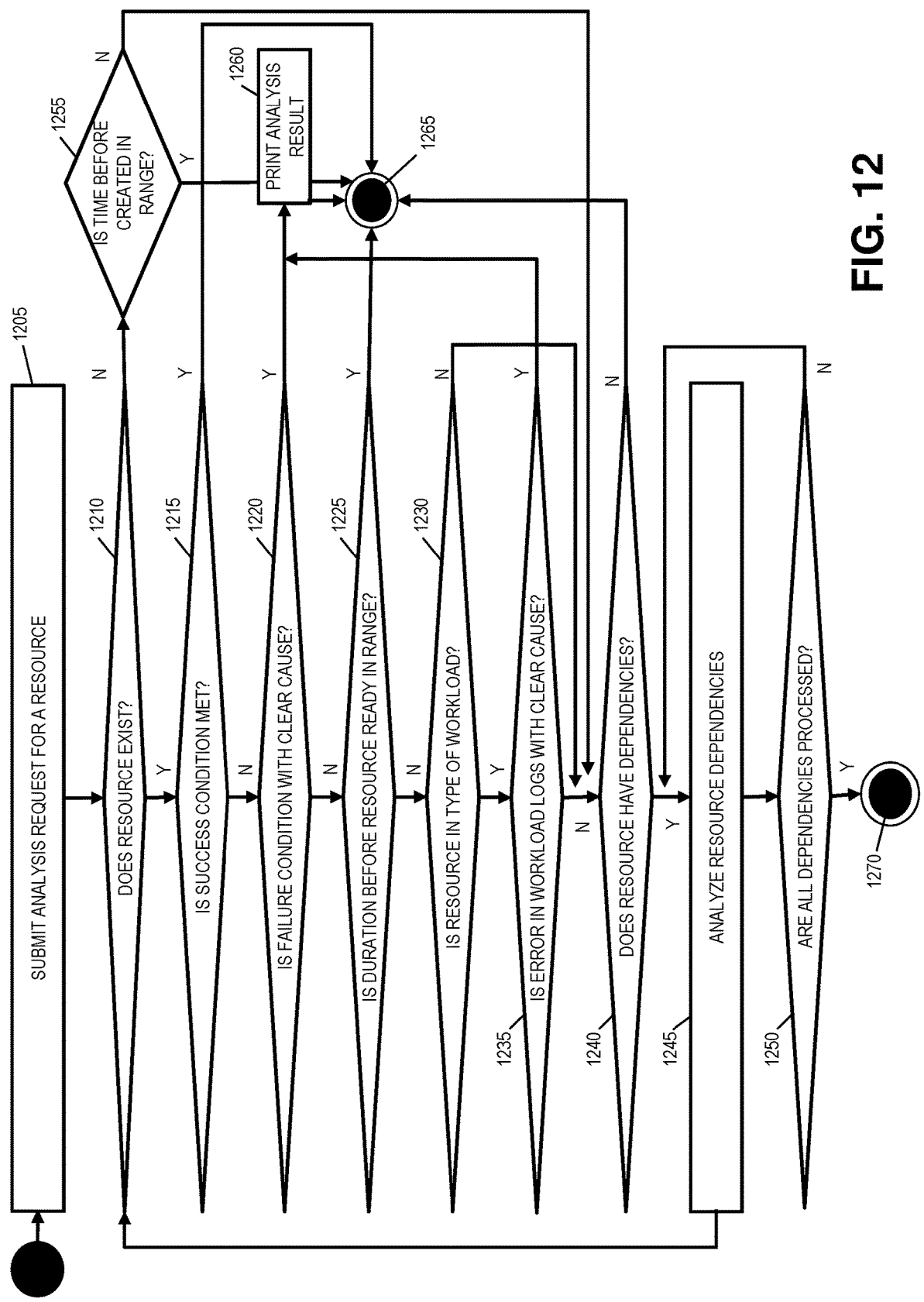
FIG. 12 shows a flowchart of an exemplary method in accordance with aspects of the present invention.

FIG. 12 shows a flowchart of an exemplary method in accordance with aspects of the present invention. Steps of the method may be carried out in the environment of FIG. 2 and are described with reference to elements depicted in FIG. 2.

At step 1205, a user device submits an analysis request for a resource. In embodiments, the user device 215 submits a request to the cluster 220 to monitor the installation of the cloud native application 245. In one example, the user sees an error in the base resource and submits a request of an analysis of the base resource.

At step 1210, the system (e.g., the installation anomaly detecting code of block 200 of FIG. 2) begins looping through the resources defined in the updated resource dependency graph 505' for this cloud native application 245. At step 1210, the system determines whether a resource defined in the updated resource dependency graph 505' exists, e.g., has been created. If no at step 1210, then at step 1255 the system determines whether the time before created in range. Step 1255 involves determining whether the first time range 711 has expired for this resource, which indicates a failure if the resource is not created within the time defined by the first time range. If yes at step 1255, then the system deems this resource has a failure condition at step 1265. If no at step 1255, then the system deems this resource has a pending condition and the process proceeds to step 1240.

At step 1210, if the resource has been created, then at step 1215 the system determines whether the success condition is met for this resource. The success condition is defined in the resource condition definition for this resource, such as success condition 315 in resource condition definition 305 or success condition 415 in resource condition definition 405. If yes at step 1215, then the system deems this resource has a success condition at step 1265. If no at step 1215, then the process proceeds to step 1220.

At step 1220, the system determines whether a failure condition with clear cause is met for this resource. The failure condition with clear cause is defined in the resource condition definition for this resource, such as the failure condition with clear cause 320 in resource condition definition 305. If yes at step 1220, then the system prints an analysis result at step 1260 and deems this resource has a failure condition at step 1265. If no at step 1220, then the process proceeds to step 1225.

At step 1225, the system determines whether the duration before resource ready is in range. Step 1225 involves determining whether the second time range 712 has expired for this resource, which indicated a failure if the resource is not ready within the time defined by the second time range. If yes at step 1225, then the system deems this resource has a failure condition at step 1265. If no at step 1225, then the system deems this resource has a pending condition and the process proceeds to step 1230.

At step 1230, the system determines whether this resource is in a type of workload. Step 1230 involves determining whether the resource has workload logs. If no at step 1230, then the process proceeds to step 1240. If yes at step 1230, then the process proceeds to step 1235 where the system determines whether there is an error in the workload logs with clear cause. The errors in workload logs with clear cause 330 are defined in the resource condition definition 305 for this resource. If one of those errors is met, then the system prints an analysis result at step 1260 and deems this resource has a failure condition at step 1265.

At step 1240, the system determines whether this resource has dependencies. In embodiments, the system analyses the updated resource dependency graph 505' to determine if this resource has any dependencies. If no at step 1240, then the process ends at step 1265. If yes at step 1240, then the process analyzes resource dependencies at step 1245 by analyzing the next resource in the updated resource dependency graph 505' that depends from this resource. This involves returning to step 1210 for a resource that depends from this resource. At step 1250, the system determines whether all dependencies for this resource have been processed. If no at step 1250, then the process returns to step 1245 to analyze more resource dependencies. If yes at step 1250, then the process ends at step 1270.

Figure 13:
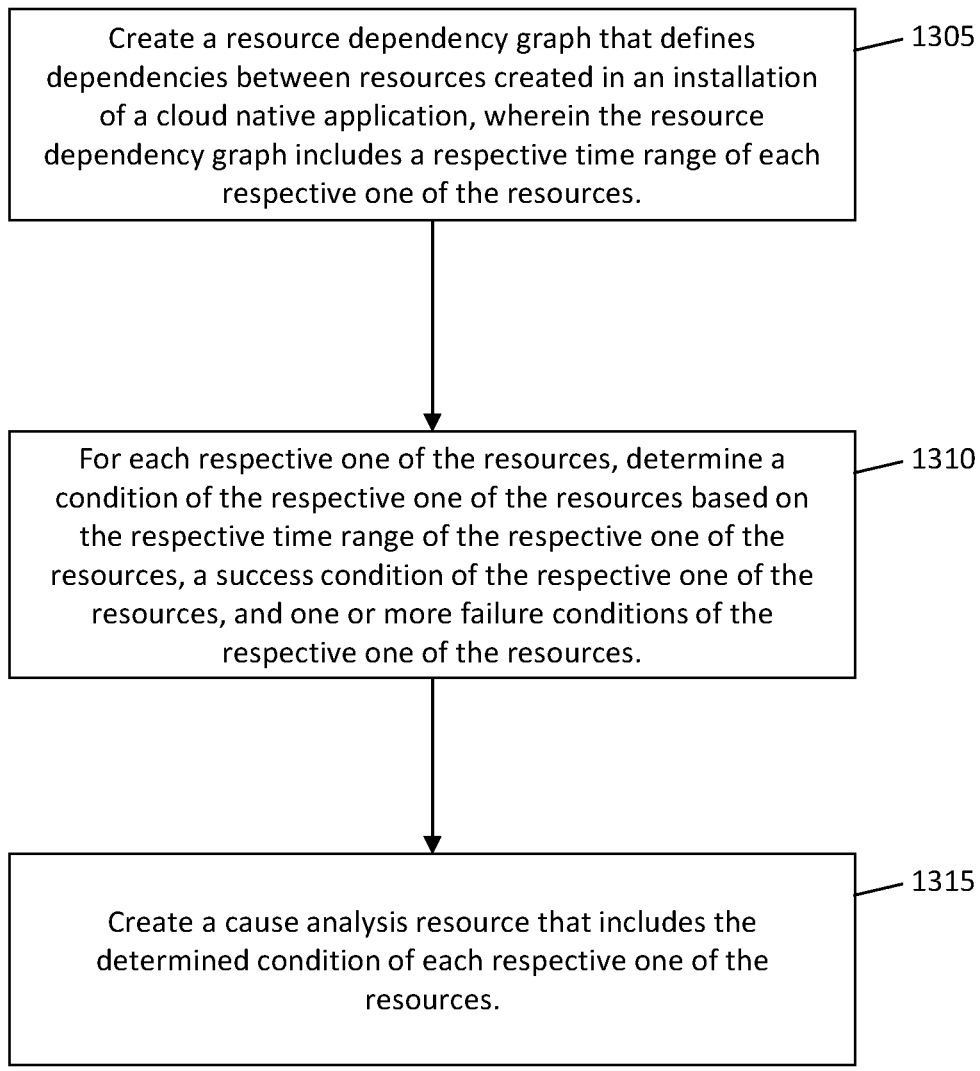
FIG. 13 shows a flowchart of an exemplary method in accordance with aspects of the present invention.

FIG. 13 shows a flowchart of an exemplary method in accordance with aspects of the present invention. Steps of the method may be carried out in the environment of FIG. 2 and are described with reference to elements depicted in FIG. 2.

At step 1305, the system creates a resource dependency graph (e.g., updated resource dependency graph 505') that defines dependencies between resources created in an installation of a cloud native application, wherein the resource dependency graph includes a respective time range of each respective one of the resources. The resource dependency graph may comprise the updated resource dependency graph 505' and the cloud native application may comprise the cloud native application 245.

At step 1310, for each respective one of the resources, determine a condition of the respective one of the resources based on the respective time range of the respective one of the resources, a success condition of the respective one of the resources, and one or more failure conditions of the respective one of the resources. The time range may comprise the first time range 711 and/or the second time range 712.

At step 1315, the system creates a cause analysis resource that includes the determined condition of each respective one of the resources. The cause analysis resource may comprise the cause analysis resource 905.

In embodiments of the method, the determined condition of each respective one of the resources comprises one of success, failure, and pending, e.g., as shown at FIGS. 10 and 11.

In embodiments of the method, the success condition of the respective one of the resources and the one or more failure conditions of the respective one of the resources are defined in a resource condition definition of the respective one of the resources. The resource condition definition may comprise the resource condition definition 305 or the resource condition definition 405.

In embodiments of the method, the one or more failure conditions comprise at least one selected from a group consisting of: failure conditions with clear cause; failure conditions without clear cause; and errors in workload logs with clear cause. These may comprise the failure conditions with clear cause 320; failure conditions without clear cause 325; and errors in workload logs with clear cause 330.

In embodiments of the method, the respective time range of a respective one of the resources comprises: a first time range that defines when the respective one of the resources is expected to be created relative to a base resource; and a second time range that defines when the respective one of the resources is expected to be ready after it has been created. These may comprise the first time range 711 and the second time range 712, respectively.

The method may further comprise determining a minimum and maximum for the first time range and a minimum and maximum for the second time range using models. The minimums and maximums may comprise, for example, the creation time minimum 716, creation time maximum 717, duration before ready minimum 718, and duration before ready maximum 719. The models may comprise instances of the model 805.

The method may further comprise training the models using data of historic installations of the cloud native application. The data may comprise multiple instances of previous installation data 750.

The method may further comprise creating a visualization using the cause analysis resource, wherein the visualization includes: the resources arranged in a diagram that shows the dependencies between the resources; and the determined condition for each of the resources. Examples of visualizations are shown in FIGS. 10 and 11.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   initiating an installation of a cloud native application;
   monitoring, by an operator in a container orchestration system, the installation of the cloud native application in a cluster;
   creating, by the operator, a resource dependency graph that defines dependencies between resources created in the installation of the cloud native application, wherein the resource dependency graph includes a respective time range of each respective one of the resources;
   for each respective one of the resources, determining, by the operator, a condition of the respective one of the resources based on the respective time range of the respective one of the resources, a success condition of the respective one of the resources, and one or more failure conditions of the respective one of the resources; and
   creating, by the operator, a cause analysis resource that includes the determined condition of each respective one of the resources.

2. The computer-implemented method of claim 1, wherein the determined condition of each respective one of the resources comprises one of success, failure, and pending.

3. The computer-implemented method of claim 1, wherein the success condition of the respective one of the resources and the one or more failure conditions of the respective one of the resources are defined in a resource condition definition of the respective one of the resources.

4. The computer-implemented method of claim 1, wherein the one or more failure conditions comprise at least one selected from a group consisting of:
   failure conditions with clear cause;
   failure conditions without clear cause; and
   errors in workload logs with clear cause.

5. The computer-implemented method of claim 1, wherein the respective time range of a respective one of the resources comprises:
   a first time range that defines when the respective one of the resources is expected to be created relative to a base resource; and
   a second time range that defines when the respective one of the resources is expected to be ready after it has been created.

6. The computer-implemented method of claim 5, further comprising determining a minimum and maximum for the first time range and a minimum and maximum for the second time range using models.

7. The computer-implemented method of claim 6, further comprising training the models using data of historic installations of the cloud native application.

8. The computer-implemented method of claim 1, further comprising:
   creating a visualization using the cause analysis resource, wherein the visualization includes: the resources arranged in a diagram that shows the dependencies between the resources; and the determined condition for each of the resources; and
   presenting the visualization via a user interface of a computer device.

9. A computer program product comprising one or more computer readable storage media having program instructions collectively stored on the one or more computer readable storage media, the program instructions executable to:
   initiate an installation of a cloud native application;
   monitor, by an operator that is an extension of an application programming interface in a container orchestration system, the installation of the cloud native application in a cluster during the installation of the cloud native application;

create, by the operator, a resource dependency graph that defines dependencies between resources created in the installation of the cloud native application, wherein the resource dependency graph includes a respective time range of each respective one of the resources;

for each respective one of the resources, determine, by the operator, a condition of the respective one of the resources based on the respective time range of the respective one of the resources, a success condition of the respective one of the resources, and one or more failure conditions of the respective one of the resources;

create, by the operator, a cause analysis resource that includes the determined condition of each respective one of the resources; and provide status updates to a user in real time during the installation of the cloud native application by:
creating a visualization, in real time during the installation of the cloud native application, using the cause analysis resource, wherein the visualization includes: the resources arranged in a diagram that shows the dependencies between the resources; and the determined condition for each of the resources; and
providing the visualization to the user via a user interface of a computer device in real time during the installation of the cloud native application.

10. The computer program product of claim 9, wherein the determined condition of each respective one of the resources comprises one of success, failure, and pending.

11. The computer program product of claim 9, wherein the success condition of the respective one of the resources and the one or more failure conditions of the respective one of the resources are defined in a resource condition definition of the respective one of the resources.

12. The computer program product of claim 9, wherein the one or more failure conditions comprise at least one selected from a group consisting of:
failure conditions with clear cause;
failure conditions without clear cause; and
errors in workload logs with clear cause.

13. The computer program product of claim 9, wherein the respective time range of a respective one of the resources comprises:
a first time range that defines when the respective one of the resources is expected to be created relative to a base resource; and
a second time range that defines when the respective one of the resources is expected to be ready after it has been created.

14. A system comprising:
a processor set, one or more computer readable storage media, and program instructions collectively stored on the one or more computer readable storage media, the program instructions executable to:
initiate an installation of a cloud native application;
monitor, by an operator in a container orchestration system, the installation of the cloud native application in a cluster, wherein the operator is an extension of an application programming interface and uses custom resources to manage one or more applications in the cluster;

create, by the operator, a resource dependency graph that defines dependencies between resources created in the installation of the cloud native application, wherein the resource dependency graph includes a respective time range of each respective one of the resources;

for each respective one of the resources, determine, by the operator, a condition of the respective one of the resources based on the respective time range of the respective one of the resources, a success condition of the respective one of the resources, and one or more failure conditions of the respective one of the resources;

create, by the operator, a cause analysis resource that includes the determined condition of each respective one of the resources;

determine a minimum and maximum for the respective time range using a trained and dynamically updated machine learning model; wherein the program instructions are executable to train the machine learning model using data of historic installations of the cloud native application to improve the accuracy of the respective time range, and thereby reduce false anomalies; and provide status updates to a user in real time during the installation of the cloud native application, wherein the status updates are based on the cause analysis resource and include notifying the user of a failure of a respective one the resources without waiting a full installation time of the cloud native application.

15. The system of claim 14, wherein the determined condition of each respective one of the resources comprises one of success, failure, and pending.

16. The system of claim 14, wherein the success condition of the respective one of the resources and the one or more failure conditions of the respective one of the resources are defined in a resource condition definition of the respective one of the resources.

17. The system of claim 14, wherein the one or more failure conditions comprise at least one selected from a group consisting of:
failure conditions with clear cause;
failure conditions without clear cause; and
errors in workload logs with clear cause.

18. The system of claim 14, wherein the respective time range of a respective one of the resources comprises:
a first time range that defines when the respective one of the resources is expected to be created relative to a base resource; and
a second time range that defines when the respective one of the resources is expected to be ready after it has been created.

19. The system of claim 14, wherein the program instructions are executable to create a visualization using the cause analysis resource, wherein the visualization includes:
the resources arranged in a diagram that shows the dependencies between the resources; and
the determined condition for each of the resources.

* * * * *